United States Patent
MacInnis

(10) Patent No.: US 7,995,141 B2
(45) Date of Patent: Aug. 9, 2011

(54) SYSTEM, METHOD, AND APPARATUS FOR DISPLAYING PICTURES ON AN INTERLACED DISPLAY

(75) Inventor: Alexander MacInnis, Ann Arbor, MI (US)

(73) Assignee: Broadcom Corporation, Irvine, CA (US)

( * ) Notice: Subject to any disclaimer, the term of this patent is extended or adjusted under 35 U.S.C. 154(b) by 1257 days.

(21) Appl. No.: 11/550,760

(22) Filed: Oct. 18, 2006

(65) Prior Publication Data

US 2007/0121002 A1 May 31, 2007

Related U.S. Application Data

(60) Provisional application No. 60/727,983, filed on Oct. 18, 2005.

(51) Int. Cl.
*H04N 7/01* (2006.01)
(52) U.S. Cl. ..................................................... 348/446
(58) Field of Classification Search .......... 348/446–449, 348/451, 452, 441, 565, 699, 700; 375/240.01, 375/240.26
See application file for complete search history.

(56) References Cited

U.S. PATENT DOCUMENTS

| | | | | | |
|---|---|---|---|---|---|
| 4,816,915 | A | * | 3/1989 | Imai et al. | 348/565 |
| 5,771,357 | A | * | 6/1998 | Kato et al. | 709/247 |
| 5,831,684 | A | * | 11/1998 | Morita et al. | 348/568 |
| 6,580,470 | B1 | * | 6/2003 | Eckersley et al. | 348/771 |
| 2002/0105596 | A1 | * | 8/2002 | Selby | 348/699 |
| 2006/0164559 | A1 | * | 7/2006 | Chou et al. | 348/700 |

* cited by examiner

*Primary Examiner* — Paulos M Natnael
(74) *Attorney, Agent, or Firm* — McAndrews, Held & Malloy, Ltd.

(57) ABSTRACT

Presented herein are system(s), method(s), and apparatus for displaying pictures on a display. In one embodiment, there is presented a method for outputting pictures. The method comprises receiving the plurality of fields for display in a particular order, where the plurality of fields are associated with the stream; detecting that a first field and a field adjacent to the first field have the same polarities; selecting between leading or lagging the fields after the first field; detecting that a second field and a field adjacent to the second field have the same polarities; selecting between leading and lagging the fields after the second field, based at least in part on the selection after the first field; detecting that a third field and a field adjacent to the third field have the same polarities; and selecting between leading and lagging the fields based at least in part on the selection after the second field.

22 Claims, 5 Drawing Sheets

SYSTEM, METHOD, AND APPARATUS FOR DISPLAYING PICTURES ON AN INTERLACED DISPLAY

RELATED APPLICATIONS

This application claim priority to "System, Method, and Apparatus for Displaying Pictures on an Interlaced Display", Provisional Application for Patent, Application Ser. No. 60/727,983 filed Oct. 18, 2005 by MacInnis, which is incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video data can have a variety of formats. For example, motion pictures are typically filmed at 24 progressive frames per second. Other material can be filmed at 30 progressive frames per second, or 30 interlaced frames per second.

The display devices are also associated with a specific display rate and format. For example, display devices according to the National Television Standards Committee display 30 interlaced frames per second.

The source video content for display on a display device can include video that has a variety of different display rates. For example, the video can include a motion picture with commercials.

While the motion picture is filmed at 24 progressive frames per second, the display device displays 30 interlaced frames per second. Accordingly, the display device uses what is known as 3:2 pull down. In 3:2 pulldown, 24 progressive frames are separated into 48 fields. Since every four fields represent the display time of five fields, one of the four fields is repeated. For example, where the progressive frames include frames F0, F1, F2, F3 . . . , the display order is T0, B0, T1, B1, T1, B2, T2, B3, T3, B3, . . . , where T# is the top field from frame F#, and B# is the bottom field from frame F#.

The motion picture can then be followed by a commercial that is filmed at 30 interlaced frames per second. The commercials are displayed without using 3:2 pull down. For interlaced frames, the top field and bottom field are captured at and represent different video times. Therefore, either top fields or bottom fields are to be displayed first.

When the last field for display from the motion picture movie has the same polarity as the first field from the commercial, the first field from the commercial is not aligned with the display device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in system(s), method(s), and apparatus for displaying pictures on an interlaced display, substantially as shown in and/or described in connection with at least one of the figures, as set forth more completely in the claims.

These and other advantages and novel features of the present invention, as well as illustrated embodiments thereof will be more fully understood from the following description and drawings.

DETAILED DESCRIPTION OF THE INVENTION

Figure 1:
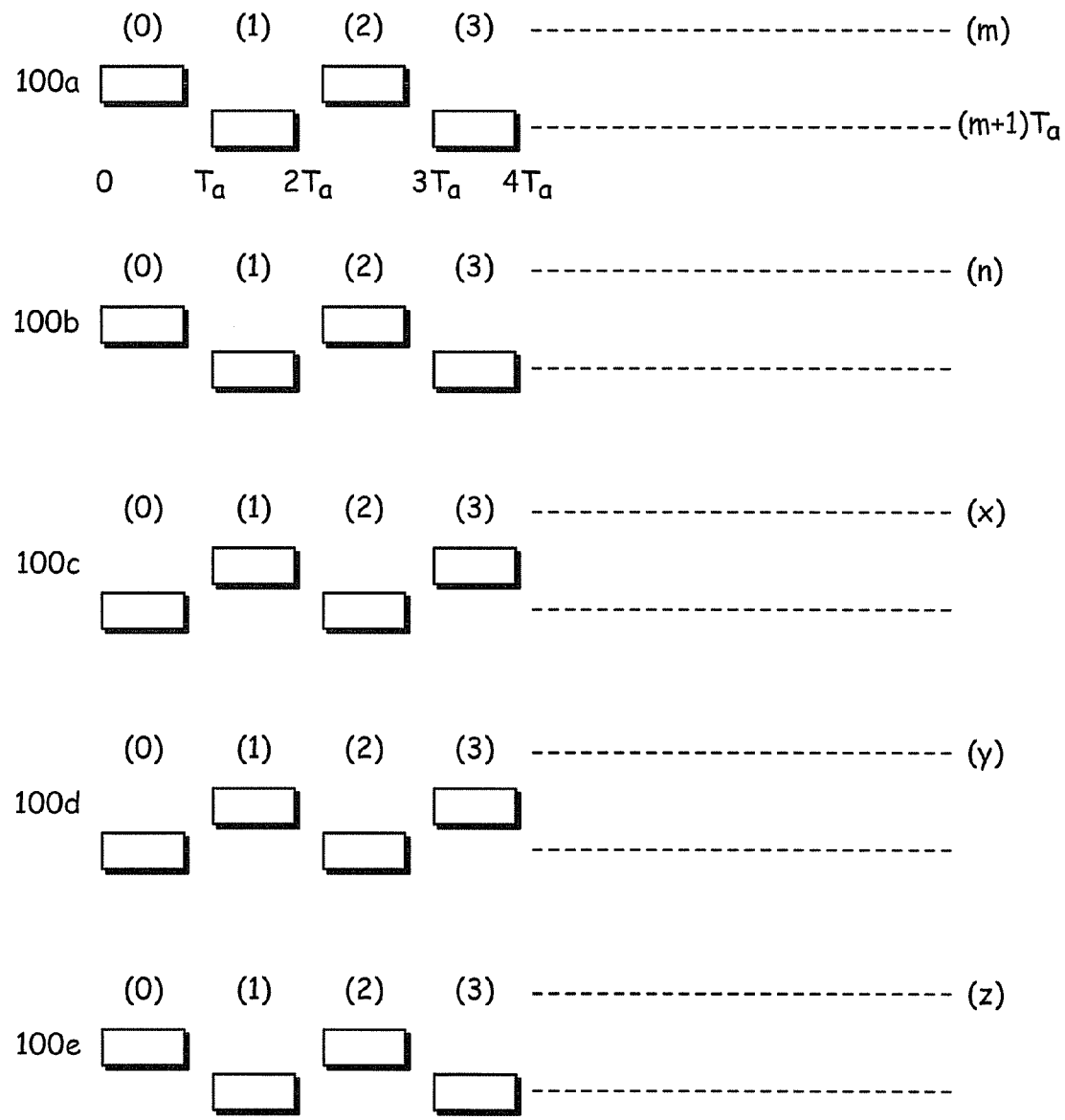
FIG. 1 is an illustration of a plurality of fields that can be displayed in accordance with an embodiment of the present invention.

Referring now to FIG. 1, there is illustrated a block diagram describing an exemplary video source in accordance with an embodiment of the present invention. The video source comprises a first plurality of fields 100a(0 . . . m) for display, a second plurality of fields for display 100b(0 . . . n), a third plurality of fields for display 100c(0 . . . x), a fourth plurality of fields for display 100d(0 . . . y), and a fifth plurality of fields 100e(0 . . . z).

The plurality of fields for display 100a, 100b, 100c, 100d, and 100e comprise top fields, e.g., fields 100a(0,2,4, . . . ), 100b(0,2,4, . . . ), 100c(1,3,5 . . . ), 100d(1,3,5 . . . ) 100e(0,2,4,. . . ) and bottom fields, e.g., fields 100a(1,3,5, . . . ), fields 100b(1,3,5, . . . ), fields 100c(0,2,4, . . . ), fields 100d(0,2,4), and fields 100e(1,3,5).

Top fields 100a(0,2,4, . . . ) represent one set of alternating lines of pixels in a frame during a period of time $0 \rightarrow T_a$, $2T_a \rightarrow 3T_a$, $4T_a \rightarrow 5T_a$, . . . , while the bottom fields 100a(1, 3,5, . . . ) represent the other set of alternating lines during alternating periods of time $T_a \rightarrow 2T_a, 3T_a \rightarrow 4T_a$, $5T_a \rightarrow 6T_a$. . . . For example, a top field can include even numbered lines while a bottom field can include odd numbered lines.

An interlaced display displays interlaced video data by displaying one of the top or bottom fields followed by the other during alternating periods of time. The display simulates motion video when displaying the top fields 100a(0,2, 4, . . . ) at times $D \rightarrow D+T_a$, $D+2T_a \rightarrow D+3T_a$, $D+4T_a \rightarrow D+5T_a$. . . , and the bottom fields 100a(1,3,5, . . . ) at times $D+T_a \rightarrow D+2T_a$, $D+3T_a \rightarrow D+4T_a$, $D+5T_a \rightarrow D+6T_a$. . . .

After displaying field 100a(m), display field 100b(0) is the next field for display in the video source. However, if field 100a(m) and field 100b(0) are both top fields (this is known as having the same polarity), the field 100b(0) will provide a top field at $D+mT_a$ when a bottom field is expected. At time $T_m$, the interlaced display may display the received top field as a bottom field and subsequent fields may also be displayed with inverted polarity. This tends to cause objectionable artifacts.

Similarly, if both field 100b(n) and field 100c(0) are bottom fields, or if both field 100c(x) and field 100d(0) are bottom fields, or if both 100d(y) and 100e(0) are top fields, fields 100c(0), 100d(0), or 100e(0) will provide fields that are opposite in polarity to what is expected.

In the foregoing circumstance, interlaced display can lag or lead the fields 100. Lagging the fields refers to delaying the display of fields 100b by at least one field period. The delay of the display of fields 100b is relative to an order of display that would occur, except for the opposing polarity of the field and the interlaced display. In cases, such as where 3:2 pulldown is used, the delay is relative to the 3:2 pulldown order. For example, the fields 100b(0, . . . n) can be displayed starting at D+(m+1)$T_a$. If at time D+m$T_a$, the interlaced display expects bottom fields, at time D+(m+1)$T_a$, the interlaced display expects top fields.

During time D+m$T_a$, the field 100a(m) can be repeated with the opposite polarity. When a top field is displayed with opposite polarity, a vertical phase shift filter can be applied to the field to convert it from e.g. a top field to a bottom field, or vice versa. In another example, a field may be displayed as if it had the opposite polarity to its actual polarity, e.g. display a top field as a bottom field, or vice versa. Alternatively, the field 100a(m-1) can be repeated. In another case, the field 100b(0) can displayed with opposite polarity, as a bottom field, and repeated at D+(m+1)$T_a$ as a top field.

Leading the fields refers to displaying at least one field from fields 100b ahead of time. The display of fields 100b ahead of time is relative to an order of display that would occur, except for the opposing polarity of the field and the interlaced display. The order of display that would occur, except for the opposing polarity of the field and the interlaced display is often explicitly indicated in a data structure that provides the fields 100 from the video source, or can be the order that the fields 100 are received. In cases, such as where 3:2 pulldown is used, the delay is relative to the 3:2 pulldown order. For example, field 100b(0) can be skipped. Field 100b(1), that is a bottom field, can be displayed starting at time D+(m+1)$T_a$. Each of the remaining fields 100b(2 . . . n) can then be displayed in order.

In the case of lagging the fields, the fields 100b can be shown one time period later, while in the case of leading the fields, the fields 100b can be shown one time period earlier.

If fields 100b(n) and 100c(0) are both bottom fields, when the interlaced display finishes displaying fields 100b(n), the interlaced display is ready to display a top field. Similarly, if the fields 100c(x) and 100d(0) are both bottom fields, the display is ready to display a top field after field 100c(x). If fields 100d(y) and 100e(0) are both top fields, the interlaced display is ready to display a bottom field after field 100d(y).

If in every case, the decision is to lag the pictures, the lag will accumulate over time. Many decoding systems and display systems include a buffer for storing pictures before decoding or before display. If the lag accumulates beyond a certain threshold, the buffers may overflow.

Alternatively, if in every case, the decision is to lead the pictures, the lead will accumulate over time. If the lead accumulates over a certain threshold, fields may not be available for display.

According to certain aspects of the present invention, the decision to lag or lead, such as after displaying 100d(y) can be based on at least one previous decision, the decisions made after displaying fields 100a(m), 100b(n), or 100c(x). The decision to lag or lead, based on at least one previous decision, can be made in a manner to offset accumulated lags, with leads, and vice versa. In one embodiment, the decisions can alternate between leading and lagging. For example, where after displaying field 100a(m), the decision is to lag, the decision after displaying field 100b(n) can be to lead, after displaying fields 100c(x), lag.

Figure 2:
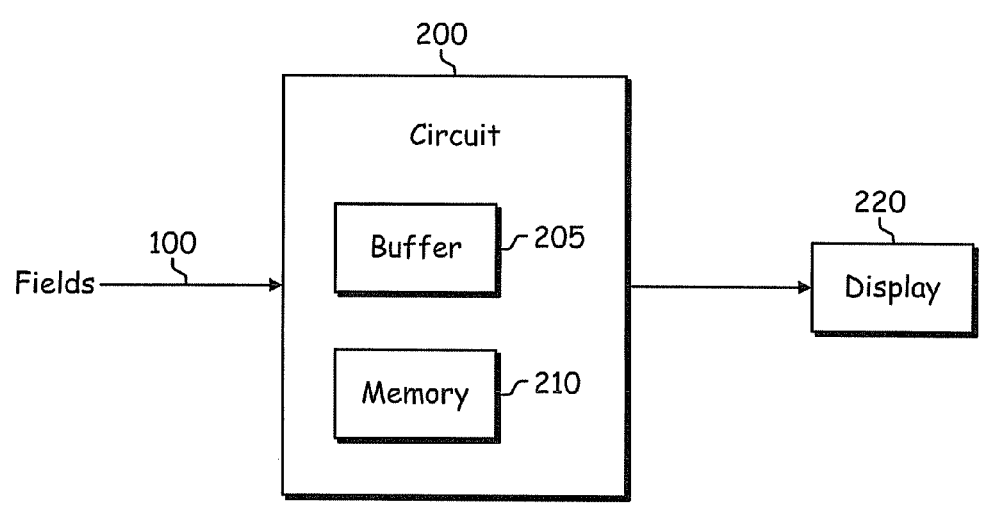
FIG. 2 is a block diagram of an exemplary circuit in accordance with an embodiment of the present invention.

Referring now to FIG. 2, there is illustrated a block diagram of an exemplary circuit 200 for providing fields 100 for display on an interlaced display 220. The circuit receives fields 100 from a video source and provides the fields 100 for display. The interlaced display 220 displays fields at time periods. The circuit 200 provides the fields 100 for display at approximately the time period that the interlaced display 220 displays the fields 100. The circuit 200 may include a buffer 205 for buffering some of the fields 100, a memory 210 for storing one or more indicators, and output port(s) 215 for providing fields to the interlaced display 220, as will be set forth below. The circuit 200 can be hardwired, comprise logic or a state machine, or comprise a programmed processor.

Figure 3:
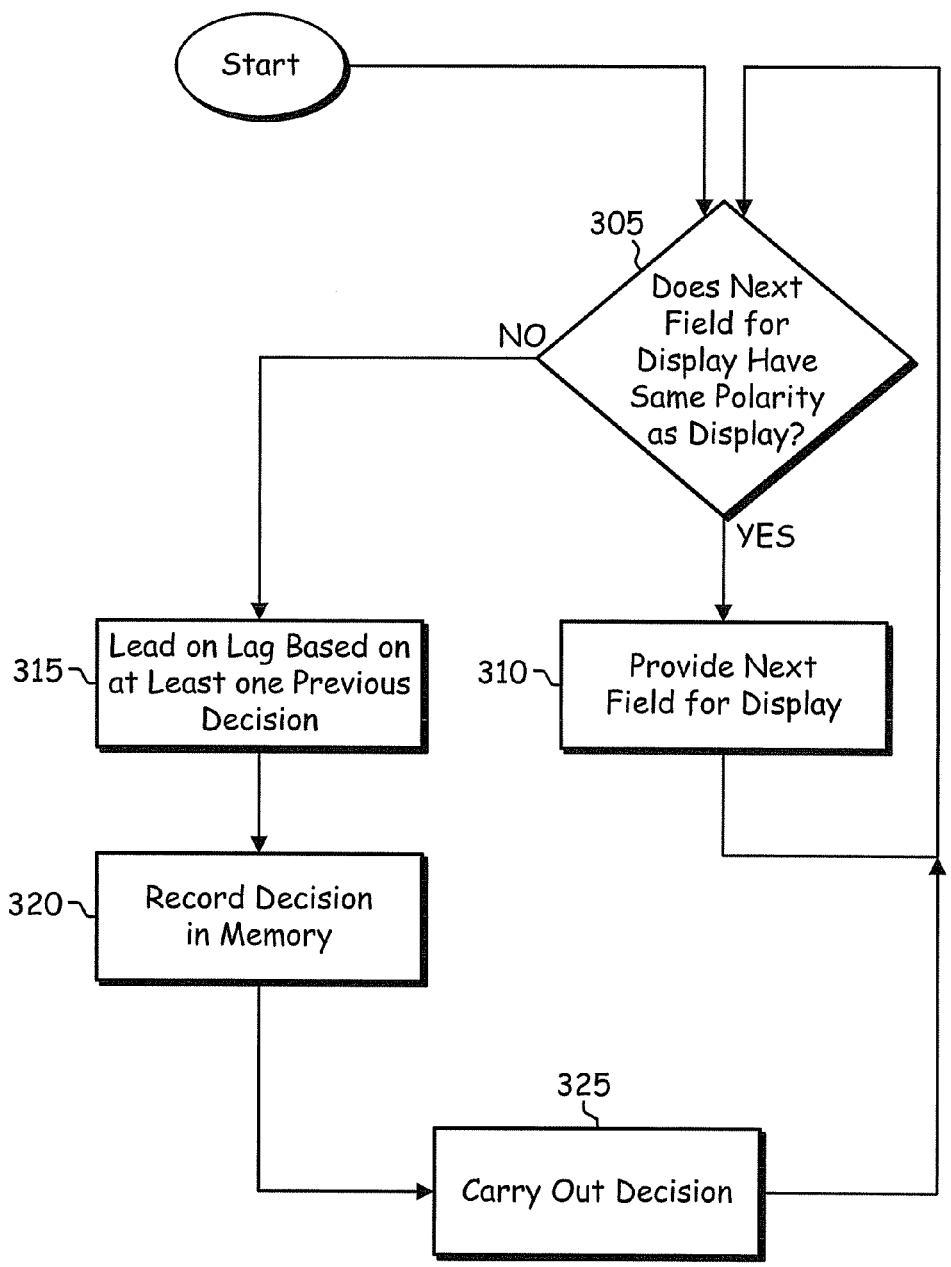
FIG. 3 is a flow chart for providing fields in accordance with an embodiment of the present invention.

The operation of the circuit 200 will now be described with reference to FIG. 3, which illustrates a flow diagram for displaying pictures in accordance with an embodiment of the present invention. At 305, the circuit 200 makes a determination whether the next field for display in the buffer 205 has the same polarity as expected for the next output. If the polarity is the same as expected for the next output, the circuit 200 provides (310) the next picture to the display 220 via output port(s) 215.

If at 305, the polarity is different, the circuit 200 decides whether to lag or lead at 315, based on previous decisions to lag or lead. In certain embodiments of the present invention, the decision to lead or lag at 315 can be set to be the opposite of the decision at the last iteration of 315. The decision is then recorded at 320, and carried out at 325.

It is noted that the rate the fields 100 are captured can be different from the rate that the fields 100 are displayed. It is also noted that the video source can include progressive frames. For example, a motion picture that includes commercials often includes progressive frames that are captured at one rate, and fields that are captured at another rate.

Figure 4:
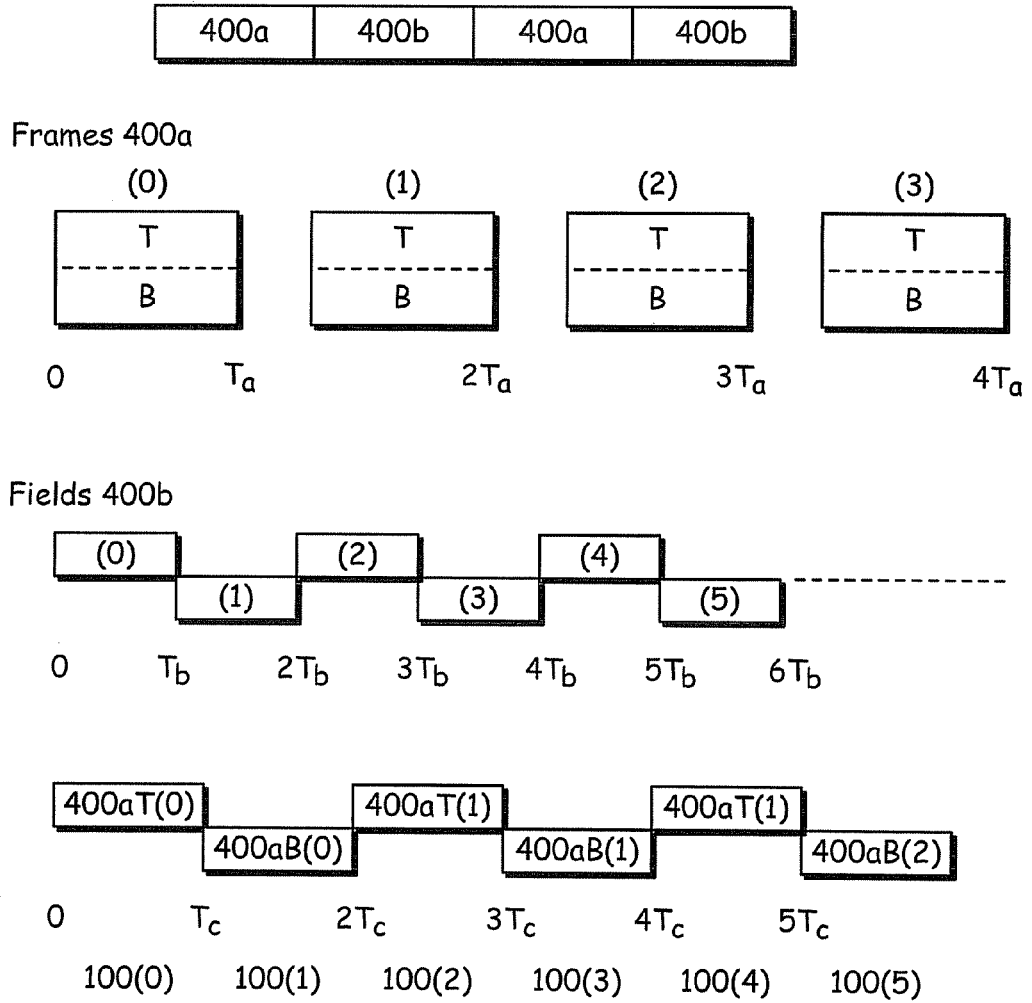
FIG. 4 is an illustration of a plurality of frames and fields that can displayed in accordance with an embodiment of the present invention.

Referring now to FIG. 4, there is illustrated a plurality of progressive frames 400a and interlaced frames 400b that are part of the transmission from a single stream. The progressive frames 400a can carry, for example, a motion picture, while the fields 400b can carry, for example commercials. The progressive frames 400a and fields 400b are commingled together.

The frames 400a(0 . . . n), and 400b(0 . . . x) correspond to time intervals 0->$T_a$, $T_a$->2$T_a$, . . . , n$T_a$->(n+1)$T_a$ and 0->$T_b$, $T_b$->2$T_b$, . . . , x$T_b$->(x+1)$T_b$. When displayed at corresponding times D+$T_a$, . . . , D+n$T_a$, D+n$T_a$+$T_b$, D+n$T_b$+x$T_b$, motion video is simulated. The amount of time that the first plurality of frames 400a and the second plurality 400b are displayed can be different.

The frames 400 can be displayed as interlaced video. When displayed as interlaced video, the display device displays top fields at particular time intervals, e.g., D->D+$T_c$, D+2$T_c$->D+3$T_c$, . . . , while displaying bottom fields at particular time intervals, e.g., D+$T_c$->D+2$T_c$, D+3$T_c$->D+4$T_c$, . . . .

The format, and time periods $T_a$, $T_b$, and $T_c$ can be different from each other, but are usually defined by standards. For example, for motion pictures, usually the frames are progressive at a rate of approximately 24 (23.976) per second. According to the National Television Standards Committee (NTSC) standard, the frames are interlaced having a rate of approximately 60 fields per second (59.94 fields/second), or 30 frames/second (29.97 frames/second).

It is common when a motion picture is broadcast with commercials, wherein-the motion picture frames 400 are captured at 24 frames per second while the commercials are captured at 60 fields per second.

In the case where 24 progressive frames/second are displayed on an interlaced display at 30 interlaced frames/sec., i.e. 60 fields/sec., a technique known as 3:2 pulldown is used. In 3:2 pulldown, the frames, e.g., top fields $400aT(0 \ldots n)$ can be created from one set of alternating lines, while bottom fields $400aB(0 \ldots n)$ can be created from the other.

The fields $400aT$ and $400aB$ are then displayed in the order, $400aT(0)$, $400aB(0)$, $400aT(1)$, $400aB(1)$, $400aT(1)$, $400aB(2)$, $400aT(2)$, $400aB(3)$, $400aT(3)$, $400aB(3)$, ..., at each period $T_c$. It is noted that one field from every second progressive frame is repeated.

The foregoing fields can then be renumbered $100(0) \ldots 100(9)$. Due to the repetition of a field, the frames can either be displayed top field first or bottom field first. At the transition from displaying frames $400a$ to frames $400b$, the display may be ready to display a field with a different polarity than field $400b(0)$. In the foregoing cases, a lag or a lead occurs. At the next transition, the opposite action is taken.

Figure 5:
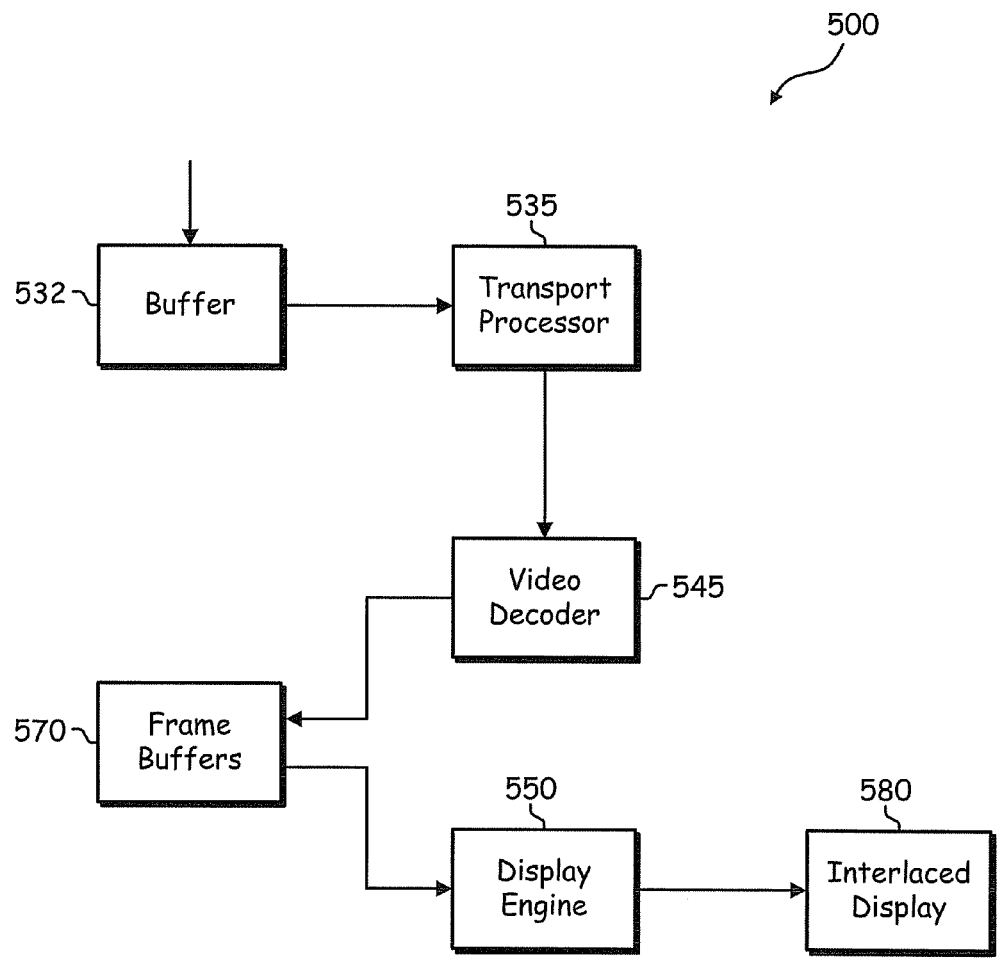
FIG. 5 is a block diagram of an exemplary circuit for displaying pictures in accordance with an embodiment of the present invention.

Referring now to FIG. 5, there is illustrated a block diagram of an exemplary circuit 500 in accordance with an embodiment of the present invention. Data is received and stored in a buffer 532. The data can be received from either a communication channel or local memory, such as a hard disk or DVD.

The data output from the compressed data buffer 532 is then passed to a data transport processor 335. The data transport processor 535 demultiplexes different data packets. At least some of the data packets carry compressed versions of the frames $400a$, and fields $400b$.

It is noted that in many implementations, the frames $400a$ and fields $400b$ may be compressed in accordance with a particular video compression standard, such as MPEG-2, or Advanced Video Coding (AVC, also known as H.264 or MPEG-4 Part 10). Additionally, it is noted that the foregoing video compression standards may reorder the fields/frames $400a/400b$ for encoding and decoding purposes.

A video decoder 545 receives and decompresses the compressed video data. While decompressing the video data, the decoded frames $400a$/fields $400b$ are stored in frame buffers 570 to await display by the display engine 550. The display engine 550 scales the video, renders the graphics, and provides fields to the display device 580.

Additionally, for motion picture progressive frames, frames $400a$, the decoder 545 effectuates 3:2 pulldown by indicating the fields $400aT/400aB$ that can be generated from the progressive frames $400a$. The foregoing results in a plurality of fields $100a(0 \ldots x)$.

After displaying field $100a(x)$, field $400b(0)$ is displayed. After outputting a top field, the next field to output should be a bottom field. Where field $400b(0)$ is a top field, a decision is made by the display manager 585 whether to lag or lead.

The display manager 585 also includes a control bit 592 that indicates the most recent decision to lead or lag at the previous transition point. The display manager 585 makes the opposite decision and toggles the control bit 592.

The embodiments described herein may be implemented as a board level product, as a single chip, application specific integrated circuit (ASIC), or with varying levels of the system integrated with other portions of the system as separate components. Alternatively, if the processor is available as an ASIC core or logic block, then the commercially available processor can be implemented as part of an ASIC device wherein certain aspects of the present invention are implemented as firmware.

The degree of integration may primarily be determined by speed and cost considerations. Because of the sophisticated nature of modern processors, it is possible to utilize a commercially available processor, which may be implemented external to an ASIC implementation.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for providing video fields for display, said method comprising:
   receiving the plurality of fields for display in a particular order;
   detecting that a first field and a field adjacent to the first field have same polarities;
   selecting between leading or lagging fields of the plurality of fields that are after the first field;
   detecting that a second field and a field adjacent to the second field have same polarities;
   selecting between leading and lagging fields of the plurality of fields that are after the second field, based at least in part on the selection after the first field;
   detecting that a third field and a field adjacent to the third field have same polarities; and
   selecting between leading and lagging the fields of the plurality of fields that are after the third field base at least in part on the selection after the second field.

2. The method of claim 1, wherein leading the fields after the first field comprises:
   skipping output of the adjacent field.

3. The method of claim 1, wherein lagging the fields after the first field comprises:
   reversing the polarity of the first field; and
   outputting the first field with the opposite polarity.

4. The method of claim 1, wherein lagging the fields after the first field comprises:
   outputting the field adjacent to the first field with the opposite polarity.

5. The method of claim 1, wherein lagging the fields after the first field comprises:
   repeating output of a field that is one of the first field and a field adjacent to the first field.

6. The method of claim 1, wherein the selection after detecting that a second field and a field adjacent to the second field have the same polarity is opposite of the selection after detecting that the first field and a field adjacent to the first field have the same polarity.

7. The method of claim 1, wherein the selection after detecting that the third field and the field adjacent to the third field have the polarity is also based at least in part of the selection after detecting that the first field and the field adjacent to the first have the same polarity.

8. The method of claim 1, wherein receiving the plurality of field further comprises:
   receiving a plurality of progressive frames; and
   generating fields from the progressive frames.

9. The method of claim 8, wherein receiving the plurality of fields further comprises:
   ordering the generated fields into the particular order.

10. The method of claim 9, wherein ordering the generated fields into the particular order further comprises:
    using 3:2 pulldown to order the generated fields.

11. The method of claim 9, wherein the particular order is indicated in a data structure providing the plurality of fields from a video source.

12. A circuit for providing fields for display from a video stream, said circuit comprising:
- a buffer for storing the plurality of fields for display in a particular order, said plurality of fields being associated with the video stream;
- and wherein the circuit is operable to:
- detect that a first field and a field adjacent to the first field have same polarities;
- select between leading or lagging fields of the plurality of fields that are after the first field;
- detect that a second field and a field adjacent to the second field have same polarities;
- select between leading and lagging fields of the plurality of fields that are after the second field, based at least in part on the selection after the first field;
- detect that a third field and a field adjacent to the third field have same polarities; and
- select between leading and lagging the fields of the plurality of fields that are after the third field, base at least in part on the selection after the second field.

13. The circuit of claim 12, wherein leading the fields after the first field comprises:
- skipping output of the adjacent field.

14. The circuit of claim 12, wherein lagging the fields after the first field comprises:
- outputting the first field with the opposite polarity.

15. The circuit of claim 12, wherein lagging the fields after the first field comprises:
- outputting the field adjacent to the first field with the opposite polarity.

16. The circuit of claim 12, wherein lagging the fields after the first field comprises:
- repeating outputting of field that is one of the first field and a field adjacent to the first field.

17. The circuit of claim 12, wherein the selection after detecting that a second field and a field adjacent to the second field have the same polarity is opposite of the selection after detecting that the first field and a field adjacent to the first field have the same polarity.

18. The circuit of claim 12, wherein the selection after detecting that the third field and the field adjacent to the third field have the polarity is also based at least in part of the selection after detecting that the first field and the field adjacent to the first have the same polarity.

19. The circuit of claim 12, wherein receiving the plurality of fields further comprises:
- receiving a plurality of progressive frames; and
- generating fields from the progressive frames.

20. The circuit of claim 19, wherein receiving the plurality of fields further comprises:
- ordering the generated fields into the particular order.

21. The circuit of claim 20, wherein ordering the generated fields into the particular order further comprises:
- using 3:2 pulldown to order the generated fields.

22. The circuit of claim 20, wherein the particular order is indicated in a data structure providing the plurality of fields from a video source.

* * * * *